No. 675,453. Patented June 4, 1901.
G. F. STURGESS.
TOW LINE.
(Application filed Oct. 4, 1897. Renewed Nov. 14, 1900.)
(No Model.)
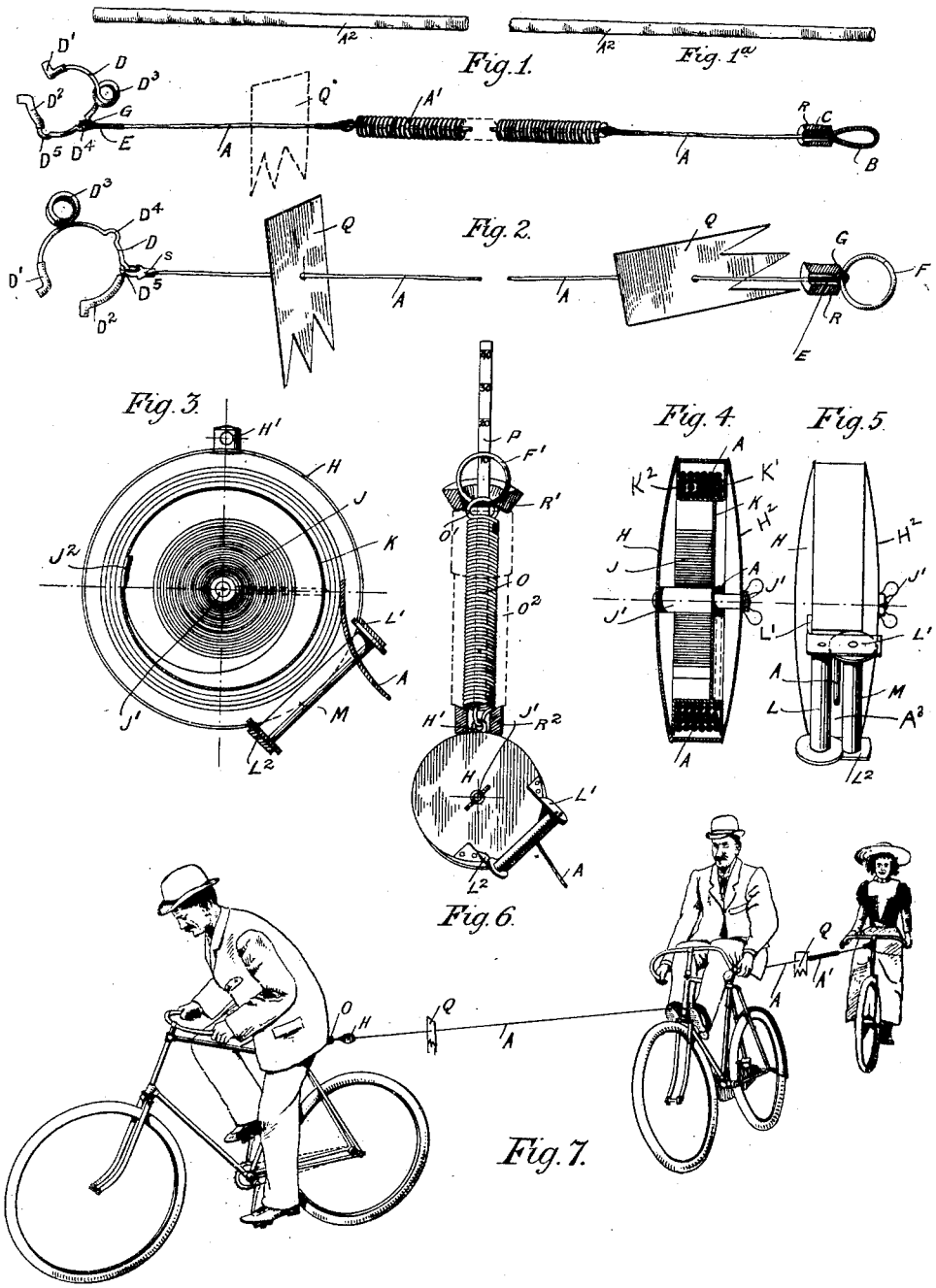

UNITED STATES PATENT OFFICE.

GEORGE FREDERICK STURGESS, OF LEICESTER, ENGLAND.

TOW-LINE.

SPECIFICATION forming part of Letters Patent No. 675,453, dated June 4, 1901.

Application filed October 4, 1897. Renewed November 14, 1900. Serial No. 36,514. (No model.)

*To all whom it may concern:*

Be it known that I, GEORGE FREDERICK STURGESS, hosier's engineer, of the Ingle-Nook, Leicester, in the county of Leicester, England, have invented an Improved Vehicle Link or Coupling, of which the following is a specification.

The main object of this invention is to obtain a vibratory or compensating and self-releasing link or coupling device with which to unite light road-vehicles (particularly cycles) that will by extension and contraction automatically counteract or counterbalance all the abnormal tension-pressure caused by shocks and minimize the friction of united travel as to materially assist the propulsion of the rearward vehicle without retarding or imposing strain on the forward vehicle and automatically detach itself on a limited tension-pressure being exceeded.

It consists of a tow line or link adapted to unite two light vehicles having means of compensating for abrupt or sudden shocks or sags occasioned by the rearward vehicle, and consequently capable of making up or recovering the distance which would otherwise be lost to the rearward vehicle, thereby reducing the manual power required to propel two vehicles, and having means for automatically releasing the link from the rearward vehicle when the rear vehicle is retarded or stopped by an obstacle or otherwise as to avoid the dangers incident to united travel and insure the safety of the riders.

I have demonstrated by experiment that considerably less united force or tension-pressure is required to propel two vehicles when connected by a spiral spring or rubber-buffered link than when connected by an ordinary tow-line, even though the ordinary tow-line be elastic in its composition, because while the latter when paid out is virtually inextensible the former when paid out is capable of extension and recoil power beyond and after the normal amount of towing pressure has been applied.

The drawings are on a reduced scale, of which—

Figure 1 is a view in perspective of a vehicle-link, showing a method of attaching the compensating spring and rubber buffer, also the self-releasing or self-detaching clip; and Fig. 1ª is a rubber sheath or covering therefor. Fig. 2 shows a similar link to the one shown in Fig. 1, the spiral spring being omitted. Fig. 3 is an inside view of the case or casing. Fig. 4 is a view in cross-section of the case. Fig. 5 is an outside view of the case; and Fig. 6 is a top view of an incased vehicle-link, the linking-clip being omitted, affixed to the seat-pillar of a cycle, the compensating spring, and buffer. Fig. 7 is a view in perspective of one cyclist assisting two others, showing the first rider equipped with the self-winding type of link shown in Fig. 6 and the second rider equipped with the hand type of link shown in Fig. 1.

Referring to Fig. 1, the compensating spring A' and buffer R are equipped with cord attachments, making a complete vehicle-link. The cord line A is reinforced with steel wire C, and thereby formed into loops at its connecting ends, and furnished with a metal eyelet G to prevent wear. The attaching end is provided with a loop B, adapted to receive the finger of the rider or a fastening or to be looped onto the vehicle. In Fig. 2 the split ring F takes the place of the loop B in Fig. 1. The free end of the link is provided with a self-releasable or self-detachable clip D, which is furnished with protecting rubber sheaths D' and D². The signal-flag Q is threaded onto the cord line and is free to travel thereon. In Fig. 1 the spiral spring is looped to the center of the cord line and is of any desired length, and when the cord line is dispensed with the split ring F and buffer R are put on one end and the clip D is put on the other end of the compensating spring, which thereupon becomes a complete towing-link in itself. A tubular rubber sheath or cover A² in the case of the hand tow-line (see Fig. 1ª) and a closed-up casing or box in the case of a self-winding tow-line (see Figs. 3 and 4) are provided to protect the line from rust, dirt, and exposure.

The vehicle-link is attached to a vehicle in any suitable manner. One way of attaching it to a cycle is to pass the loop B first through the horizontal tube of the seat-pillar and then through the buffer R, securing the same by inserting a buttonhook, or peg of wood through the loop B, the peg being held tight by reason of the buffer R closing over the loop B, or the split ring F is used, it being threaded through the eyeleted end, as shown in Fig. 2, after it has been passed through the seat-pillar. The clip D is then affixed to any part of a rear vehicle, and a compensating self-releasing coupling or connection is thereby made. The connection may be maintained until the rear rider by back-pedaling imparts sufficient drag force or tension-pressure as to release the clip or until some obstacle interrupts the progress of the rear vehicle, upon which the link automatically releases itself without jeopardizing the riders. When not in action, the clip is secured to any part of the vehicle or cycle to prevent trailing.

The flag Q (best shown in Fig. 2) indicates the presence of the tow-line in action and warns other travelers against passing between the linked-up vehicles, thereby avoiding collisions with unattached passers-by and further insuring the safety of the riders.

Buffer R and spiral spring A' are firm enough to resist the normal amount of towing pressure imposed by the rearward vehicle when two vehicles are traveling unitedly, but are flexible enough to absorb all vibration and drag strain exceeding the said normal tension-pressure, and owing to the vibratory or recoil action set up by the friction incident to locomotion it may be said that the compensating towing-link is constantly pulling the rear cycle to the forward cycle, resulting in a saving of power to the rear rider largely exceeding the support given or the purchase afforded by the forward rider.

In motion on the level road the forward vehicle acts as a point of purchase for the spring, and the intermittent vibratory or compensatory action is effectually resisted by the momentum of the forward cycle, which of course has a regular or uniform motion, and by virtue of this compensatory or counter-balancing action the rear vehicle or rider is recovering or making up the distance that would otherwise be so much lost ground at every jolt or jar experienced. While five or six pounds is the total normal pressure or tension required to pull a cycle, for instance, the spring and buffer are strong enough to compensate for any amount of intermittent abnormal drag strain or pressure up to the point at which the clip releases itself—say thirty pounds.

The action of the compensatory spring-balance will be better understood when I say that if the shock-pressure were constant and strong enough the pressure thereof would equal or balance the power expended by the forward rider, and as a result the spiral spring would be completely extended, the buffer completely contracted, and the full or maximum drag strain or abnormal tension-pressure would be thrown onto the forward rider, as is the case when no balancing-springs are used; but always provided that the compensating spiral springs and rubber buffers are made equal to the strength required, it follows that they will absorb the intermittent maximum or abnormal pressure by their expansion and recoil action or resilient power and will consequently lessen the manual power required to propel two vehicles on the same lines and for the same reason that a vehicle having a spring or elastic tire requires less power to propel it than one having a wooden tire. The clip is coiled upon itself at $D^3$ to give flexibility and allow of its ready attachment and detachment and grips with more or less power, according to the size of tube it is put upon. The rubber sheaths D' and $D^2$ on the clip effectually prevent it becoming detached from the line and protect the enamel of the cycle. The connection or grip of the clip is stronger or weaker, according to where the loop-eyeleted end E or swivel S, Fig. 2, is placed on the clip. When the eyeleted end is in the indent $D^4$, the clip will withstand a towing pressure of, say, ten pounds, in the coil $D^3$, say, twenty pounds, and in the indent $D^5$, say, thirty pounds, after which the clip will release itself.

Referring to Fig. 2, a split ring F, threaded through the eyelet G and looped end E, and a metal swivel S are employed to facilitate attachment.

The hand type of link (shown in Fig. 1) will do for some vehicles and for cycles in which the rear wheel is protected by a mud-guard; but when the rear wheel is unprotected or when the line is affixed to the front of a cycle, as is desirable when carried by a cyclist who wishes to hitch onto a preceding vehicle, a longer cord line, and consequently a take-up for the slack or sag of the cord line, is required. This is provided for in the manner shown in Fig. 6, details of which are shown in Figs. 3, 4, and 5. A closed-up cover or case H, having an aperture $A^3$ for the passage of the cord line A, a center screw-pin J', and a detachable lid $H^2$ and furnished with a swivel H', and also friction-rollers L and M, is provided to receive the cord line. The case H is attached to the compensating spring and buffer by the swivel H' and yields to the inclination of the cord line, as seen in Fig. 6. A dished reel K, having flanges K' and $K^2$ (see Fig. 4) to wind the cord line on, is mounted on the pin J' and is revoluble thereon. The flanges K' and $K^2$ serve to prevent the friction of the cord line on the sides of the case H. Within the dish of this reel is a volute spring J, one end of which is secured to the pin J' of the case and one end to the reel at $J^2$. The cord line is fastened to the reel in a manner that when released the spring pulls the cord in again, as seen in Fig. 4. When connected, the volute spring is completely paid out as soon as the traveling vehicles are united normally and has no power to counteract or compensate for the abnormal pressure or shock tension that occurs intermittently, while the spiral spring O, being in a substantially compressed state, and the rubber buffer R', being in a substantially extended state, when the vehicles are united and normal pressure is applied are able to compensate for such shock tension, they being brought into requisition intermittently corresponding to the intermittent application of shock tension or abnormal pressure. The cord line passes over the rollers L and M, which are journaled in the arms L' and L² of the case and serve to prevent the cord line fraying out on the edge of the aperture A'. While the spring J is strong enough to draw the cord line A into the box, it is not strong enough to strike the wheels or rider with the clip end when the link detaches itself.

In order to throw the pressure of united travel onto the center pin J' of the case, the line is passed through the reel and secured to the pin J', the cord being first provided with an eyelet G, similar to the one shown in Fig. 1. To prevent wear on the raw edge of the aperture in the reel through which the line is threaded, the edge of the aperture is turned back upon itself, making it round. As will be seen, the spiral spring or the rubber buffer R may be used alone for the purpose of compensation, if made strong enough. Referring to the self-winding type of link, when attached to a solid seat-pillar the compensation-spring is simply coiled around the pillar, both ends being secured to the swivel H', and the rubber buffer dispensed with; but when the seat-pillar is tubular the compensation-spring O, Fig. 6, is linked to the swivel H' and then passed through the pillar O² and secured by the split ring F', the rubber buffer R' being arranged, as shown, to aid the compensation-spring O and the rubber buffer R² being arranged, as shown, to silence the action. The end P of the spring is passed through the coils and is provided with a scale of numbered index-lines P', which serve to indicate the extreme amount of tension thrown upon the spring and the amount of pressure the clip will bear before releasing. The spring self-releasing clip, the metallic compensating spring, and the rubber buffers are made in any of the well-known forms, suitable types of which are those shown.

Having now particularly described and ascertained the nature and objects of my said invention and in what manner the same is to be performed, I declare that what I claim is—

1. In a tow line or link for light vehicles, in combination, means to protect the line from wear and exposure, composed of the casing, provided with a connecting-swivel and rubber buffers, and further provided with a detachable lid and antifriction cord-rollers, the line-reel provided with flanges and an aperture through which the line is threaded and fastened onto the center pin, upon which the line-reel revolves in a manner as to throw the strain of the line onto the casing, the metal of the edge of the said aperture being turned back upon itself, substantially as and for the purposes set forth.

2. A link or device adapted to unite two vehicles, having a spring self-detachable device at its free end capable of withstanding a limited amount of tension-pressure exceeding which it detaches or releases itself from one vehicle, and means whereby the amount of pressure required to release the clip can be varied or adjusted, composed of a steel clip-fastening coiled upon itself to give flexibility, and having an opening between its two ends and indents to receive the free end of the link or device, substantially as and for the purposes set forth.

3. The combination with a towing-line for light road-vehicles, of a compensatory balance-spring, capable of recoil action on a line with its axis, containing a reserve of spring-power after the towing-line has become taut and inextensible, substantially as and for the purposes set forth.

Dated this 25th day of September, 1897.

GEORGE FREDERICK STURGESS.

Witnesses:
THOMAS SCOTT,
T. S. SHOULER.